United States Patent [19]
Perrick

[11] Patent Number: 5,857,283
[45] Date of Patent: Jan. 12, 1999

[54] LIVE ACTION FISHING LURE

[76] Inventor: James D. Perrick, 2984 Lostwood Dr., Sandy, Utah 84092

[21] Appl. No.: 838,450

[22] Filed: Apr. 7, 1997

Related U.S. Application Data

[63] Continuation of Ser. No. 463,722, Jun. 5, 1995, abandoned.
[51] Int. Cl.$^6$ ................................................ A01K 85/00
[52] U.S. Cl. ...................... 43/42.5; 43/42.39; 43/42.28; 43/42.37
[58] Field of Search ................................ 43/42.5, 42.28, 43/42.32, 42.18, 42.37, 42.39

[56] References Cited

U.S. PATENT DOCUMENTS

| | | | |
|---|---|---|---|
| D. 376,407 | 12/1996 | Friday | 43/42.32 |
| 1,791,723 | 2/1931 | Hampton . | |
| 1,910,742 | 5/1933 | Burns | 43/42.28 |
| 2,000,734 | 5/1935 | Accetta | 43/42.18 |
| 2,032,819 | 3/1936 | Tengel | 43/42.18 |
| 2,043,001 | 6/1936 | Lambrecht . | |
| 2,051,978 | 8/1936 | Accetta | 43/42.28 |
| 2,148,074 | 2/1939 | Kaspick . | |
| 2,179,641 | 11/1939 | Layfield . | |
| 2,218,259 | 10/1940 | Finucan | 43/42.5 |
| 2,298,691 | 10/1942 | Greggains | 43/42.5 |
| 2,463,889 | 3/1949 | Lundemo . | |
| 2,569,792 | 10/1951 | Wilson | 43/42.5 |
| 2,580,733 | 1/1952 | Cowden . | |
| 2,583,680 | 1/1952 | Brennan . | |
| 2,619,757 | 12/1952 | Freire . | |
| 2,787,860 | 4/1957 | Carr . | |
| 2,805,512 | 9/1957 | Bunce . | |
| 2,817,921 | 12/1957 | Czesnocha . | |
| 2,851,815 | 9/1958 | Warner | 43/42.5 |
| 2,948,984 | 8/1960 | Crawford | 43/42.5 |
| 3,096,597 | 7/1963 | Dickinson . | |
| 3,229,407 | 1/1966 | Quyle . | |
| 3,343,296 | 9/1967 | Davis | 43/42.37 |
| 3,495,350 | 2/1970 | Livense . | |
| 3,541,718 | 11/1970 | Norman . | |
| 3,568,351 | 3/1971 | Perrin . | |
| 3,673,727 | 7/1972 | Bauer . | |
| 3,750,323 | 8/1973 | Weis | 43/42.37 |
| 3,753,310 | 8/1973 | Werner . | |
| 3,848,354 | 11/1974 | Austad et al. . | |
| 3,981,096 | 9/1976 | Toivonen . | |
| 4,122,624 | 10/1978 | Smith . | |
| 4,123,870 | 11/1978 | Wiskirchen . | |
| 4,134,224 | 1/1979 | Clark . | |
| 4,201,006 | 5/1980 | Wetherald . | |
| 4,422,260 | 12/1983 | Perrick . | |
| 4,641,455 | 2/1987 | Johnson . | |
| 4,823,502 | 4/1989 | Tucker . | |
| 4,936,041 | 6/1990 | Couture . | |
| 5,063,704 | 11/1991 | Phillips . | |
| 5,446,991 | 9/1995 | Brackus . | |

FOREIGN PATENT DOCUMENTS 260496  7/1949  Switzerland .

*Primary Examiner*—Kurt Rowan
*Attorney, Agent, or Firm*—M. Reid Russell

[57] ABSTRACT

A live action fishing lure for attachment onto the end of a fishing line to be trolled or cast that provides a fishing lure with a vigorous swimming action for attracting fish. The lure includes a flat blade with a curved stern end and pointed bow, has straight sides, and which blade stern end bent thereacross is tapered from a blade mid-section to the pointed bow end. The blade is connected along its longitudinal axis to a rigging snap for connection to a fishing line that functions also as a pivot coupling allowing the blade to wobble vigorously around its longitudinal axis as it is pulled through water. A snap ring or half ring is fitted through a hole or holes formed in or adjacent to the blade stern end that connects also to a bait device eyelet end that can be a hook eyelet end which snap or half ring functions also as a pivot coupling. The hook includes a forward portion that extends to a right angle bend to a straight center section and is then curved into a barb end. Preferably, the hook includes a weight secured thereto at the right angle bend, that is formed therein ahead of a hook straight center section that is covered as by winding thread, feathers, and the like, therearound to have an insect or other bait appearance.

8 Claims, 3 Drawing Sheets

LIVE ACTION FISHING LURE

The application is a continuation application of parent application Ser. No. 08/463,722 filed on Jun. 5, 1995 under the same title, abandoned on filing of this application.

BACKGROUND OF THE INVENTION

1. Field of the Invention

This invention relates to devices for mounting bait items as fishing lures that are for attachment to a fisherman's line to be cast and/or pulled through the water to attract a fish to strike the lure.

2. Prior Art

A number of lures and devices for use by fishermen in their pursuit of catching fish have been developed and marketed. For the recreation fisherman, such devices generally provide for their attachment to an end of a fishing line that connects onto a reel, or the like, that, in turn, mounts onto a pole. The arrangement is for positioning the lure at a location, such as on the bottom of a lake or pond, or for moving the lure through water, for attracting fish to the lure. Particularly relevant to the invention are lures that provide to the lure the appearance of an insect, small fish, or the like, that certain fish feed on, and for a wiggling of swimming movement when pulled through the water.

The combination of a lure that has a fish attracting appearance and provides a vibration or wobble when pulled through the water is not new. Some examples of such devices are shown in U.S. Pats. to Layfield, No. 2,179,641 and Cowden, No. 2,580,733. Further, a number of combination hook and device for attaching bait, such as a small fish, thereto are shown in U.S. Pats. to Hampton, No. 1,791,723; to Kaspick, No. 2,148,074; to Brennan, No. 2,583,680; and in a Swiss Pat. to Hass, No. 260,496. Also, one such combination hook and bait attaching device is shown in an earlier U.S. Pat. to the present inventor, No. 4,422,260. None of which devices, however, provide a device for imparting a swimming motion to a hook that is attached thereto and is camouflaged to look like an insect, small fish, or the like. Nor does any earlier device utilize a wobble inducing blade arrangement as does the invention to provide a vigorous swimming action to the lure.

A fishing lure that includes a camouflaged hook that connects by a flexing connection to a wobble inducing blade and was arranged to be pulled through the water was earlier developed and marketed by the inventor. FIGS. 1 and 2 are here provided with this disclosure showing that device. This earlier fishing lure is, however, unlike the present invention both in its structure and functioning as set out and described in the detailed description of the invention in relation to FIGS. 1 and 2.

SUMMARY OF THE INVENTION

It is a principal object of the present invention to provide a wobble inducing device for mounting a live action fishing lure for convenient attachment onto a fishing line that, when pulled through the water, will have a swimming action to attract fish thereto.

Another object of the present invention is to provide a device that is simple to attach to a fishing line at a rigging snap that, in combination with a rectangular blade whereto the snap is attached as a pivot coupling provides an oscillation action to a covered hook or like fishing lure attached thereto by a half or split ring type pivot coupling to provide a lure that closely approximates a swimming action to attract fish.

Another object of the present invention is to provide a rigging snap for attachment to a fishing line to pivotally couple a rectangular blade thereto that has at least one bend formed across a blade stern end, which blade, at the stern end, connects through a split or half ring as a pivot coupling to a covered hook or like fishing lure, the arrangement providing a lure that will exhibit a swimming action as it is pulled through the water with the hook barb end pointing upwardly.

Still another object of the present invention is to provide a wobble inducing rectangular blade for pivotal attachment to a covered hook body, preferably including a pair of weights arranged to appear as insect eyes and are positioned below the center line of the split or half ring that connects the hook to the rectangular blade, which weights encourage and help sustain a lure wiggling action with the weights swinging under the split or half ring.

Still another object of the present invention is to provide a device that is easily installed onto and removed from a fishing line that can be trolled or cast at a variety of speeds without a danger of the device rolling or twisting.

Principal features of the live action fishing lure of the invention include a blade that is formed from a thin section of material, preferably a stiff plastic, and has flat top and bottom surfaces with sides that slope together at a forward or a bow end forming an apex, with the top and bottom surfaces narrowing together at the apex forming a point bow end, and with a stern end rounded thereacross. The blade rear or stern end includes at least one hole formed therethrough to receive a split ring or two spaced holes to receive ends of a half ring fitted therein, which blade rear or stern end is bent upwardly thereacross forward of the split ring hole or across the spacing between the two holes to elevate the forward section of the blade above the plane of the rear or stern section. A pair of holes are formed through the blade forward section that are spaced apart along its longitudinal axis and are to receive a rigging snap fitted therethrough. The rigging snap, that is preferably a section of stiff wire that is bent into a half circle and is bent outwardly at its end, with an end thereof to be threaded through the rigging snap holes and with the other rigging snap end formed into an eyelet to receive an end of a fishing line tied thereto. So arranged, the rigging snap eyelet end will function also as a pivot to allow the blade to pivot around its longitudinal axis, imparting a wobbling movement to the lure. The blade forward section inward slope to the apex end in turn, is opposed by a weight and shape of a lure or hook as is secured to the split ring or to the half ring and further tends to cause the lure to pitch up and down as it is pulled through the water.

An eyelet end of a hook covered body or like lure receives the split ring fitted therethrough or is fitted through the half ring, to provide a pivot coupling that allows the fishing lure to swing across the blade stern end as well as to pivot up and down, relative to the blade stern end. To encourage hook or like lure to swing and travel up and down, a forward portion of a hook body that ends in the eyelet is bent through an angle approaching ninety (90) degrees, at a spaced distance from which eyelet, and adjacent to which bend, a pair of equal weights are secured to opposite sides of the hook body at the bend. The hook body, between the pair of weights, and therealong to where it curves into a barbed end, is preferably wrapped with thread, feathers, and/or the like, to form an insect appearing shape, with the weight to look like insect eyes. Additionally, other lure arrangements such as a rubber worm, spinner, or the like, having an eyelet mounting end, can be attached to the split or half ring as described within the scope of this disclosure.

In practice, the fish lure travels through the water with its hook barb end pointing upwardly, with the weights below the blade centerline, allowing the wrapped hook to swing back and forth around its pivot coupling to the split or half ring. The blade pivot coupling to the line at the rigging snap to allow the blade to pivot around its longitudinal axis with the blade upwardly sloping forward section causing the blade to pitch up and down. Which blade pivoting around its longitudinal axis, and up and down pitching action, along with the hook swinging across the split or half ring, provides the fishing lure of the invention with a realistic swimming action.

Additional objects and features of the invention will become apparent from the following detailed description and claims, taken together with the accompanying drawings that show a preferred form of the invention.

THE DRAWINGS

Figure 1:
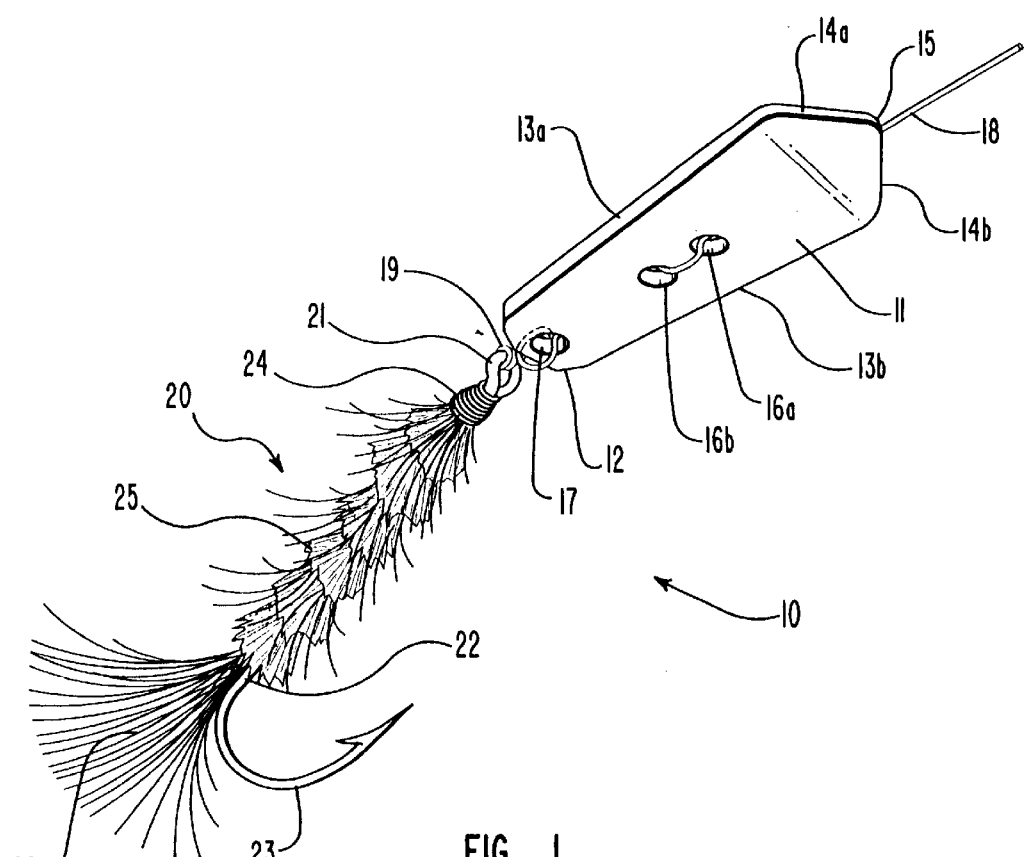
FIG. 1 is a side elevation perspective view of an earlier lure that the present invention improves upon.
Figure 2:
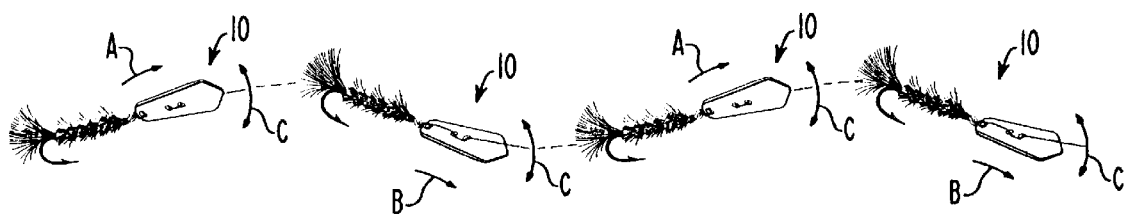
FIG. 2 is a side elevation view of successive positions of the action lure of FIG. 1 that is attached to a fishing line and is pulled through water.
Figure 3:
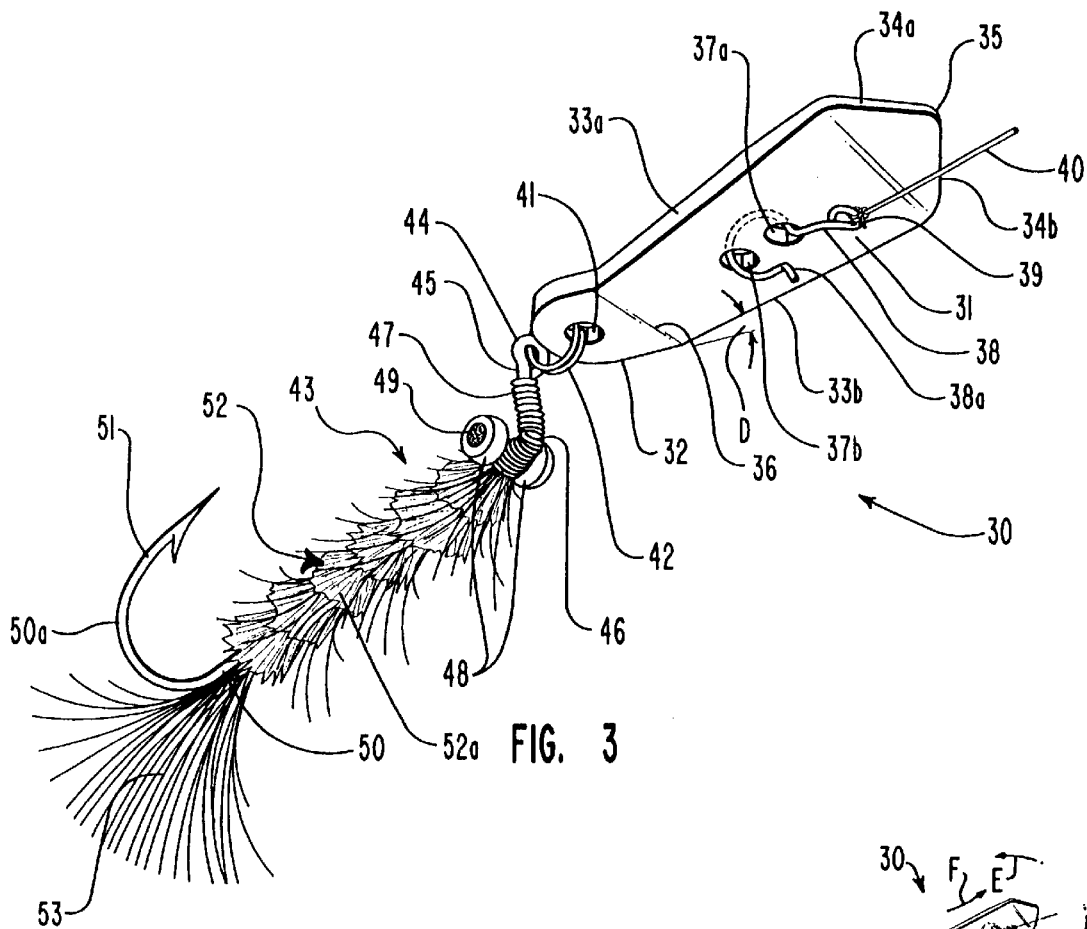
FIG. 3 is a side elevation perspective view of a live action fishing lure of the invention showing a number of major structural distinctions from the lure of FIG. 1.
Figure 4:
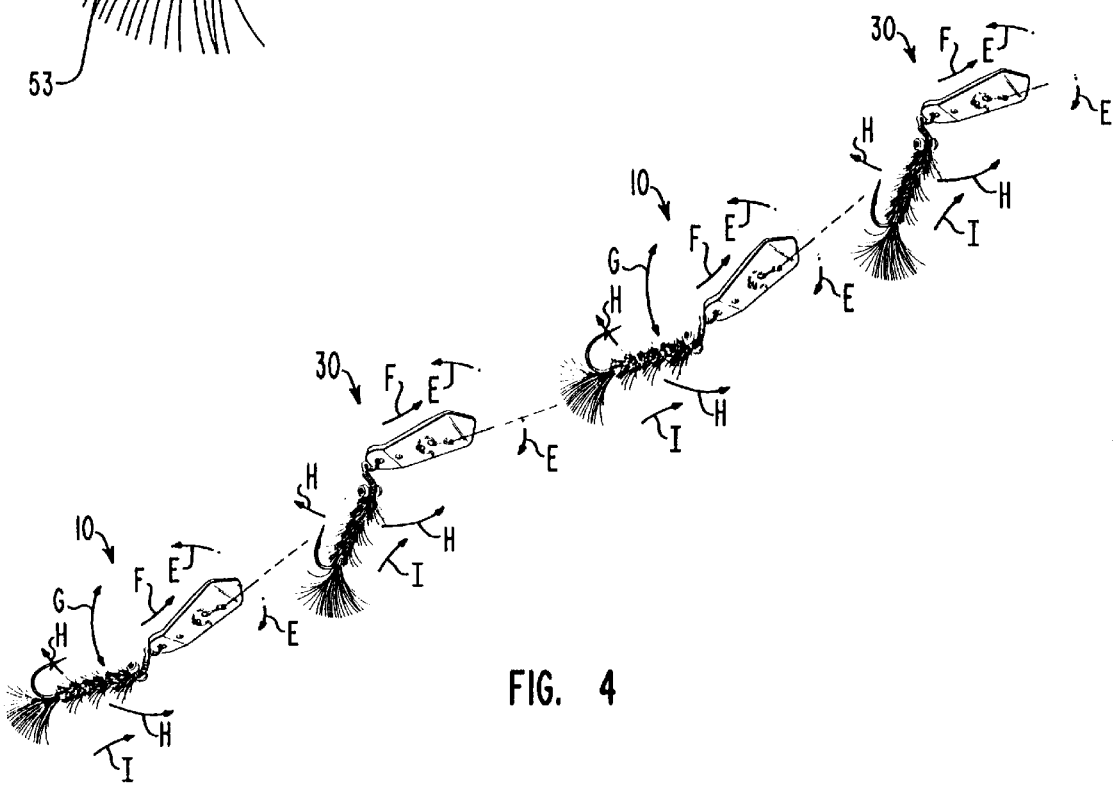
Figure 5:
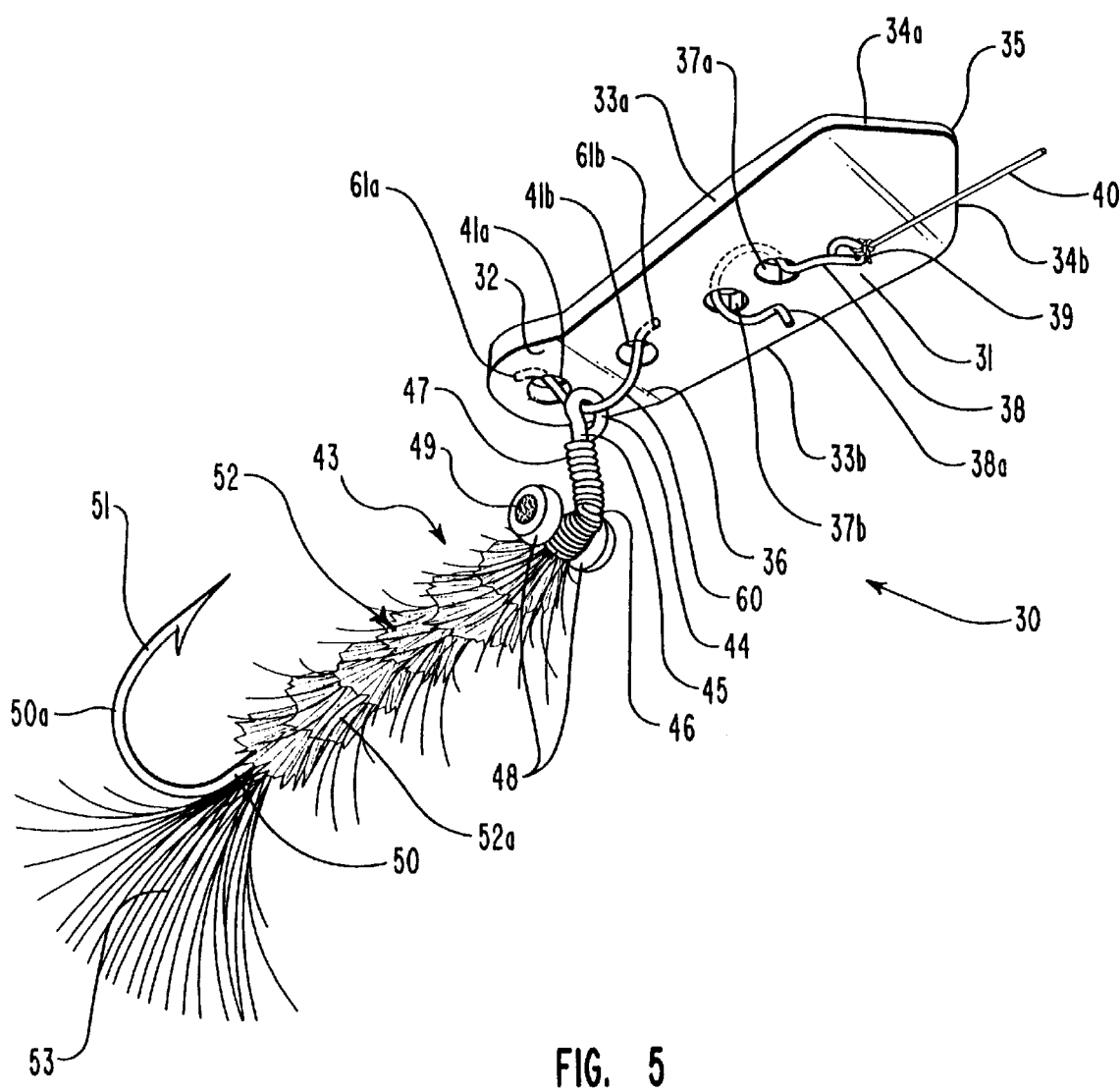

FIG. 4 is a side elevation view like that of FIG. 2 showing successive positions of the live action fishing lure of FIG. 3 attached to a fishing line and traveling through the water illustrating the functioning of the lure of the invention in contrast to that of the prior art lure of FIGS. 1 and 2; and FIG. 5 is a view like FIG. 3 only showing a stern section of the blade of the invention shown as having a pair of spaced holes formed at its longitudinal axis wherein ends of a half ring are shown fitted with an eyelet end of a hook shown installed through the half ring.

DETAILED DESCRIPTION

FIG. 1 shows an early embodiment of an earlier lure 10 that was manufactured and sold by the present inventor, with the present invention in a live action fishing lure 30 shown in FIGS. 3, 3A and 4, and hereinafter referred to as lure 30. Earlier lure 10 includes a flat blade 11 of a uniform thickness that extends from a broad curved rear end 12, having straight opposing sides 13a and 13b to a transition whereat blade forward sides 14a and 14b that slope inwardly to a pointed bow end 15. A lower face of the blade 11 slopes upwardly and terminates in a narrow point at the bow end 15. A pair of spaced aligned forward and rear holes 16a and 16b, respectively, are formed along the blade longitudinal center axis at the blade midsection. A hook connection hole 17 is formed in the blade stern end that aligns with the holes 16a and 16b. Which holes 16a, 16b and 17 to receive a fishing line 18 threaded therethrough. In practice, the fishing line 18 is threaded from a bottom or undersurface of the blade 11 up through the forward hole 16a, down through the rear hole 16b and then up through the hook connection hole 17. Thereafter, the fishing line end is passed across the blade rear end and back through the hook connection hole 17, forming a loop. The loop is tied at knot 19 through an eyelet end 21 of a hook 20. The hook 20 is thereby connected to the end of line 18.

The hook 20 has a body 22 that is straight from the eyelet end 21 to where it curves into a hook barb end 23, and is preferably covered with cord, thread, feathers, or the like to have an appearance that resembles an insect with a broad head 24. The insect body can be formed by wrapping the hook body from adjacent to the eyelet end therealong with thread, feathers, cord, or the like 25, secured along the hook body, and preferably includes a tail 26. So arranged the hook 20 has an insect appearance.

The earlier lure 10 will travel through the water, as illustrated in FIG. 2, such that the hook barb end 23 is pointing downwardly. The earlier lure 10, being pulled on the end of line 18, as shown in the successive views, traveling upwardly, as illustrated by arrow A, until the blade bow end tilts downwardly responsive to a reduction in water pressure thereon. Thereat, the bow end will bite into the water to pivot the lure downwardly, as illustrated by arrow B, and so forth. During which up and down movement, the earlier lure 10 blade 11 pivots back and forth around its longitudinal axis creating a wobbling side to side motion, as illustrated by arrow C. The earlier lure 10 thereby tends to rise and descend and wobble side to side as it is pulled through water. In which travel, the hook 20, that is flexibly connected to the blade 11 by the end of line 18, follows behind the blade, but does not pivot independently therefrom. Further, in practice, the earlier lure 10, when trolled, has to be pulled at a certain speed or it would tend to roll rather than move side to side.

The present invention in lure 30, as shown and described with respect to FIGS. 3, 4 and 5, provides a new and unique lure structure to that shown as earlier lure 10. Lure 30, in practice, provides a life like lure movement that is like the swimming action as a live bait would exhibit. Accordingly, the lure 30 provides a unique and unobvious improvement over the earlier lure 10.

Lure 30, shown in FIG. 3, includes a blade 31 that is like the blade 11 in that it includes a broad curved rear or stern end 32 with spaced apart sides 33a and 33b that extend therefrom to first slope equidistantly apart and then slope back together at bow sides 34 and 34b that converge into a forward bow end 35. Also, between where bow sides 34a and 34b slope together into a bow end 35, before the transition from sides 33a and 33b to bow sides 34a and 34b, the blade lower surface, is preferably uniformly sloped upwardly, narrowing the blade and terminating in pointed bow end 35.

Distinct from blade 11, blade 31 includes a bend 36, that is shown as a line formed across a lower section that is spaced apart from the stern end 32 which bend 36 is illustrated in FIG. 3 as an angle D between the blade stern and forward portions that is of approximately thirty (30) degrees and may be an angle of from fifteen (15) to forty five (45) degrees within the scope of this disclosure. The angle formed at bend 36 is to elevate the blade forward portion above the plane of the blade stern end to allow that stern end to travel in essentially a horizontal attitude as the lure 30 is pulled through the water, as illustrated in FIG. 4.

Like the blade 11, the blade 31 includes a pair of spaced forward and rear holes 37a and 37b formed along the blade longitudinal axis. Which holes 37a and 37b of lure 30 receive an end 38a of a rigging snap that is preferably formed from a section of stiff wire 38 threaded therethrough. The rigging snap 38, bent to fit through holes 37a and 37b, provides a pivot coupling to the blade 31. The rigging snap includes an eyelet end 39 formed in its upper end opposite to end 38a as a fishing line connector, that receives an end of a fishing line 40 fitted and tied therethrough. So arranged, the fitting of the rigging snap 38 through the blade 31 holes 37a and 37b provides a pivot coupling that allows the blade to freely pivot back and forth around its longitudinal axis. This provides a wobbling action to the lure as it is pulled through the water, illustrated as curved arrows E in FIG. 4. Which rotation is much freer and more pronounced than was achieved by the line connection of the line 18 to the earlier lure 10, and provides thereby a much more life like swimming action to the lure 30 than was possible with lure 10. Further, the coupling of the rigging snap 38 to the blade 31 provides a simplified connection arrangement for joining the lure 30 onto fishing line 40 over the threading of line through holes 16a, 16b and 17 of the earlier lure 10. In practice, the use of the rigging snap 38 allows the lure 30 to be cast or trolled at a variety of speeds without the lure rolling or twisting.

FIG. 3 shows a split ring 42 preferably turned through the hook connection hole 41, as a pivot coupling as a pivot arrangement for coupling the blade 31 to a bait device shown as a lure that includes a hook 43 that, in turn, receives an eyelet 44 of a lure hook 43 of the invention.

As an alternative to the split ring 42 of FIG. 3, as shown in FIG. 5, a half ring 60 can be used as the hook mount pivot coupling. To utilize which half ring 60, a pair of spaced holes 41a and 41b are formed in the blade 31, with hole 41a in the stern end 32 being the same as hole 41 and with hole 41b spaced therefrom along the blade longitudinal axis. Which holes 41a and 41b are to receive bent end 61a and 61b of the half ring 61. To provide which mounting, as shown in broken lines, with the one half ring end 61a seated in hole 41a, the opposite half ring end 61b is flexed to bow the half ring to where end 61b will fit into hole 41b, shown in solid lines, completing the mounting. Prior to which installation of the half ring end 61b in hole 41b, the eyelet end 44 on the end of the forward section 45 of hook 43 is threaded over the half ring, as shown.

The bait device 52 is shown in FIG. 3 and 5 as lure hook 43 body, preferably includes a forward section 45 that is spaced a distance from the eyelet 44, and is bent at 46 through approximately ninety (90) degrees into a hook body straight center section 50. Which hook body beyond the center section is curved back upon itself into a hook barb end 51. The forward section 45, as shown, can wind, as with a cord 47 to the bend 46 whereat, preferably, a pair of weights 48 are attached onto opposite sides of that forward section, at bend 46. Which weights are shown herein as preferably being round disks and preferably have dots 49, or the like, painted onto the weight centers to give them the appearance of eyes.

From the bend 46 to where the hook body 50 is curved into the hook barb end 51, the hook body is straight and preferably receives materials such as line, thread, cord, feathers 52a, or the like, wrapped, tied or otherwise connected thereto to camouflage the hook body to afford the bait device with a resemblance to an insect body. Further, feathers 53, or the like, can be attached to extend outwardly from the hook body curved portion to have the appearance of a tail, further camouflaging the hook to have an insect appearance. Alternatively, other kinds of baits can be attached to the split or half ring as a fishing lure. Such could involve rubber or plastic devices, such as worms, small fish, grubs, or the like that can include self contained weights, a spinner, or the like, can be so attached to blade 31, all of which arrangements, it should be understood, are within the scope of this disclosure.

Shown in FIG. 4 and as described above, a pivoting or wobbling action afforded to the blade 31 by the pivot coupling of the rigging snap 38 to the blade and forward and rear holes 37a and 37b, is illustrated by curved arrows E, with up and down diving and rising action of the blade, is provided by the blade shape and its sloping bow and bend 36 formed across the blade stern portion, illustrated as straight arrows F. Additionally, the split ring 42 or half ring 60 connection of the blade, at the stern portion hole 41 and at holes 41a and 41b, with the eyelet 44 of the hook forward section 45, provides a pivot coupling that allows the lure hook to pivot around the split ring, illustrated by curved arrows G. Also, the hook forward section 45 length to the bend 46, and due to the weights 48 secured to the hook at that bend, provide a moment arm whereby the hook body 50, that is below the blade stern portion center line, tends to swing around the split ring or half ring junction, having a pendulum action, as illustrated as arrows H. In which lure travel through the water the hook barb end 51 shown in FIGS. 3 and 5 above a curved section 50a is maintained in a vertical upwardly pointing attitude to minimize a danger of the hook barb end snagging as has been a problem with earlier lures, including the earlier lure 10, that operate with the hook barb end down. Which pivot coupling of the lure 30 hook 43, as provided by the split ring 42 and half ring 60, allows the lure hook 43 to trail the blade 31 so as to move up and down oppositely to the blade direction of travel, as illustrated by arrows I.

The above described movements of the blade and the lure hook are such as to give the appearance of a vigorous insect, or other bait item, as set out above, swimming through the water, to both attract a fish's attention and promote their striking the lure hook. Which swimming action has here been described relating to the elements of the lure 30, and as contrasted with the less active and effective earlier 10, thereby clearly distinguishing the present lure 30 over earlier lure 10, and other fishing devices.

While a preferred embodiment of the present invention in a live action fishing lure has been shown and described herein, it is to be understood that the present disclosure is made by way of example only and that variations and changes thereto are possible without departing from the subject matter coming within the scope of the following claims, and a reasonable equivalence thereof, which subject matter is regarded as my invention.

I claim:

1. A live action fishing lure comprising a blade formed from a thin section of material having a stern end wherefrom spaced opposing sides extend and diverge outwardly and then converge forming a bow end opposite said stern end, said blade is bent across said stern end upwardly at an angle of between fifteen (15) and forty five (45) degrees, said blade having first and second holes formed through a mid portion of said blade at spaced apart points along a longitudinal axis of said blade and a first stem hole in said stem end, a rigging snap having a curved portion extending through said first and second holes connected to an eyelet end which is attachable to a fishing line, a bait device connected to said first stern hole by a pivot means, said bait device comprising a hook having an eyelet attached to said pivot means, said hook having a body including a straight forward section connected to said eyelet at one end and a straight center section connected to said forward section through approximately a ninety (90) degree bend at another end of said forward section and a curved section connected to another end of said straight center section, said curved section terminating in a hook barb end, camouflage material secured to said straight center section and weight means consisting of a pair of disk shaped weights with each weight secured to an opposite side of said hook body at said ninety (90) degree bend.

2. A live action fishing lure as recited in claim 1, wherein the pivot means is a split ring for fitting through said first hole formed through said blade stern end.

3. A live action fishing lure as recited in claim 1, wherein, additional to the first stem hole formed through the blade stern end, a second stern hole is formed through said blade stern end, spaced apart from said first stern hole and forward towards the bow end and is located at a point along the blade longitudinal axis, and the bait device mounting means is a rigging snap that is a section of stiff wire that is bent in a center portion into a half ring ends of and said stiff wire ends are bent to align with one another and to point oppositely, which said wire ends are for fitting in the first stern and second stern holes.

4. A live action fishing lure as recited in claim 1, wherein the hook body straight center section is wrapped with a cord means therealong that functions as both the camouflage means and as a means for securing the pair of weights.

5. A live action fishing lure as recited in claim 4, wherein the pair of weights are identical disk shaped weights with an outer surface of each said disk shaped weight having a dot formed thereon to provide an appearance of an insect eye.

6. A live action fishing lure as recited in claim 1, wherein the hook body straight center section is wrapped with thread, cord, feathers, to provide an insect body appearance; and feathers are secured to an end of said hook body straight center section adjacent said curved section providing an appearance of an insect tail.

7. A live action fishing lure as recited in claim 1, wherein the blade is formed from a clear plastic material and the bend across the stern end section is a thirty (30) degree bend.

8. A live action fishing lure as recited in claim 1, wherein said opposing sides slant inwardly to a narrow width at the bow end.

* * * * *